United States Patent [19]

Tan et al.

[11] 4,360,537

[45] Nov. 23, 1982

[54] LIPOPROTEIN EMULSIONS FOR FOOD USE AND METHODS FOR PREPARING THE SAME

[75] Inventors: Chee-Teck Tan, Middletown, N.J.; Gail P. Howard, York, Pa.; Earl W. Turner, Port Chester, N.Y.

[73] Assignee: International Telephone and Telegraph Corporation, New York, N.Y.

[21] Appl. No.: 27,417

[22] Filed: Apr. 5, 1979

Related U.S. Application Data

[63] Continuation-in-part of Ser. No. 682,298, May 3, 1976, abandoned.

[51] Int. Cl.³ .............................................. A23L 1/32
[52] U.S. Cl. .................................... 426/656; 426/614; 426/653; 426/552; 426/553; 426/573; 426/98; 426/554
[58] Field of Search ............... 426/614, 656, 653, 552, 426/553, 554, 573, 98

[56] References Cited

U.S. PATENT DOCUMENTS 2,913,342  11/1959  Cameron et al. ..................... 426/98
3,295,986   1/1967  Saslaw et al. ........................ 426/98
3,356,507  12/1967  Wingerd .............................. 426/656
3,935,325   1/1976  Gilmore et al. ................. 426/656 X

OTHER PUBLICATIONS

Handbook of Food Additives, 1968, Edited by Furia et al., Chemical Rubber, Cleveland, pp. 415, 567.
The Condensed Chemical Dictionary, 8th Ed., 1971, revised by Hawley, Van Nostrand & Reinhold: New York, pp. 412, 840, 841.
Introduction to the Biochemistry of Foods, 1963, Braverman, Elsevier Publ. Co., New York, p. 114.

Primary Examiner—Joseph M. Golian
Attorney, Agent, or Firm—John T. O'Halloran; David M. Quinlan

[57] ABSTRACT

Liproprotein emulsion system composed of protein, edible oil and other selected food ingredients are proposed and used to replace egg yolk and other natural materials in various food products. New and improved processes are described for the preparation of lipoprotein emulsions in a liquid or dry form for use in cake; protein beverages and other food compositions. These processes include methods to improve the solubility and functional properties of the protein component. The lipoprotein system can be used alone or in combination with egg white or other heat coagulable proteins to be a complete or partial substitute for whole eggs. Examples illustrate the practice of this invention to replace egg yolk in cake, donut, muffin, custard and like products.

18 Claims, 4 Drawing Figures

LIPOPROTEIN EMULSIONS FOR FOOD USE AND METHODS FOR PREPARING THE SAME

BACKGROUND OF THE INVENTION

This application is a continuation-in-part of Ser. No. 682,298 filed May 3, 1976 which is now abandoned.

This invention relates to processes for the preparation of lipoprotein emulsion systems for use in bakery products and other foods. It also relates to the composition of egg yolk replacers used alone or in combination with egg white or other heat coagulable proteins to replace all or at least part of the total egg used in bakery and other food products.

Eggs are a basic ingredient in cake and other baked products where they serve important functional properties and have an improving effect on product quality. Functions of egg and egg yolk which are important in cake batter include: emulsifying capacity; leavening action; protein binding to maintain cake volume and cell structure; tenderizing; moisturizing effect to maintain freshness; provide protein nutrition and overall improvement in eating quality.

While eggs are commonly available, cost restricts their use in bakery products. An economical replacement which will provide the functional properties of egg yolk would be most desirable.

About a dozen egg yolk replacers are now commercially available and have been analzyed. Our study shows that they lack the desired functional properties for use in cake products and the like. The cake tests made using currently available egg yolk replacers resulted in cakes having varying degrees of low volume, coarse texture, non-uniform cell structure, weak texture, and unacceptable flavor.

SUMMARY OF THE INVENTION

It is, therefore, an object of the invention to provide an improved composition and processes for the preparation of lipoprotein emulsion systems which possess the required functional properties for the replacement of all or a part of the egg yolk in cake and other food products.

Another object of the invention is to provide processes which improve the solubility and functional properties of soy protein isolates for use in the preparation of egg yolk replacers.

A further object of the invention is to provide egg yolk replacers which are comprised of an emulsion of a water soluble protein component, vegetable oil, lecithin and other selected food ingredients.

It is still another object of the invention to provide processes for the preparation of egg yolk replacers in a liquid or dry form for use in cake and other food products.

A still further object of the invention is to provide a composition of egg yolk replacers used in combination with egg white or other heat coagulable proteins to replace a substantial part of the total egg used in cake and other food products.

And, it is yet another object of this invention to provide for the use of liquid or dried lipoprotein emulsions to replace egg yolk in cake, donuts, muffins, and similar food products.

BRIEF DESCRIPTION OF THE DRAWINGS

Other objects, features, and advantages of the invention will be best understood from the following description taken in conjunction with the drawings, in which.

DESCRIPTION OF THE PREFERRED EMBODIMENTS

Description of Lipoproteins

The functional properties of egg yolk in cake and other food systems which include the emulsifying capacity, protein binding, tenderizing, moisturizing effect, etc. are due to properties of the lipoproteins contained in egg yolk. The lipoproteins of egg yolk, lipovitellin and lipovitellenin are conjugates of the proteins vitellin and vitellenin with the phospholipids lecithin (phosphotidylcholine) and cephalin (phosphotidylethanolamine). The proteins vitellin and vitellenin are insoluble except at alkaline pH and only a portion of the phospholipids, lecithin and cephaline are in equilibrium binding with these proteins.

There is a remarkable resemblance between the natural lipoproteins in egg yolk and the lipoprotein emulsion systems prepared according to the invention. The soy protein isolates or other protein sources used to prepare the egg yolk replacer emulsion are solubilized at a mildly alkaline pH. This results in a strong net electronegative charge on the protein molecules since the isoelectric point of the proteins used are below pH 7.0, usually between pH 4.0 to 5.0. The electronegatively charged protein molecules then form conjugates with the strong electropositive groups present in the lecithin (phosphotidylcholine) and cephalin (phosphotidylethanolamine) which are contained in the soybean lecithin used in the emulsion system. The lipoprotein conjugates thus formed are hydrophilic (protein)$\longleftrightarrow$hydrophobic (lipid) dipoles which reduce the interfacial tension between the oil and water phase of the emulsion system and form fat globule membranes which serve as a protective colloid to stabilize the emulsion and provide the functional properties characteristic of the natural lipoproteins contained in egg yolk.

Thus, lipoprotein emulsions prepared as described in the invention can be used to replace egg yolk in cakes and other food products.

The present lipoprotein emulsions of this invention result in a significant improvement in the quality and functional properties of egg yolk replacers for use in cake and other bakery products. A process has been developed for the formation of lipoprotein emulsions which possess the functional properties of egg yolk. These emulsions are prepared using soy proteins and other low cost food ingredients. These emulsions are low in cholesterol which offers a nutritional advantage to people who wish to restrict their dietary intake of cholesterol. Lipoprotein emulsions can be prepared in a liquid, frozen or solid dry form for use in different food products. They can also be blended with whole egg, egg white or other heat coagulable proteins for use as whole egg replacers.

The lipoprotein emulsion system is composed of soy protein, edible oil, lecithin, emulsifiers and coloring ingredients which are blended and homogenized to produce a stable emulsion. When the lipoprotein emulsion is produced in a dry form by spray or freeze drying, sucrose or other soluble carbohydrates such as maltodextrins or corn syrup solids are added to the emulsion before drying to improve the emulsion stability, and to aid in solubilizing the dry product. The composition of the emulsion including the protein edible oil and lecithin content can be varied to optimize the functional properties required for use in different food products.

Response surface design experiments and other tests were conducted to determine the optimum combinations of the major ingredients including protein, soybean oil and lecithin required for the formulation of egg yolk replacers for use in cake and other bakery products. These studies showed that the formulation can be varied to achieve certain desired functional properties for particular product applications. Examples of lipoprotein emulsions which closely approximate functional properties of natural egg yolks for use in cake and other food applications are shown in Table I as follows:

TABLE I

| FORMULAS FOR LIPOPROTEIN EMULSIONS | Percent by Weight | |
|---|---|---|
| Ingredient | A* | B* |
| Soy protein isolate[1] | 53.50 | 33.45 |
| Soybean oil | 10.91 | 21.40 |
| Lecithin concentrate | 12.02 | 7.04 |
| Sucrose or other carbohydrates such as maltodextrin, corn syrup solid, etc. | 20.00 | — |
| Corn syrup solids | — | 33.94 |
| Sodium chloride | — | 1.29 |
| Disodium phosphate (anhyd.) | 0.81 | 0.65 |
| Sorbitan monostearate | 0.34 | 0.27 |
| Polysorbate 60 | 0.64 | 0.52 |
| Sodium stearoyl-2-lactylate | 0.97 | 0.79 |
| Beta-Carotene solution (1% in oil) | 0.81 | 0.65 |
| TOTAL | 100.00 | 100.00 |

Note:
[1]Ralston Purina Co. Supro 620 or Supro 710 Soy protein isolates described in U.S. Pat. Nos. 3,642,490 and 3,694,221 or proteins having film forming properties which enhance the cell structure and texture.
*These formulations will be used in the following text and identified as Formula I-A and I-B.

Experiments on the above formulas for egg yolk replacer have shown that the following ingredients are not absolutely essential when the pH of the protein solution is adjusted to pH 8.5 to 9.5: disodium phosphate, sodium phosphate, sodium stearoyl-2-lactylate, polysorbate 60 and sorbitan monostearate. However, the texture of certain cake products are improved when these ingredients are added singly or in various combinations to the basic egg yolk replacer formula and are included in the preferred embodiments.

We discovered that the solubility and gel or film-forming properties of the protein component are particularly important in preparing egg yolk replacers for use in cake. The binding properties of the protein are also important in cake where protein-protein binding is necessary to maintain cake volume, cell structure and texture. Commercially available low cost soy sources described in U.S. Pat. Nos. 3,642,490, 3,645,745, 3,694,221 and Food Engineering, Vol. 38, No. 5 were evaluated for the purpose of determining the preferred protein sources which would produce the best functional properties when used in food products. These included the following:

Supro 700, Supro 710, Supro 620, Supro 610, and Supro 630 soy protein isolates produced by Ralston Purina Co.;

Promine R, Promine D, Promine F soy protein isolates produced by Central Soya Co.; and ProFam 90HS, ProFam 90LS soy protein produced by Grain Processing Corp.

Due to the good solubility and film-forming properties, Supro 700, Supro 710, Supro 620, and ProFam 90HS are preferred for use as an egg yolk substitute in baked food products.

Good results with respect to cake volume, grain and texture were obtained using a lipoprotein egg yolk replacer made with 30 to 55% by weight Supro 620 and Supro 710 soy protein isolate. We also obtain good results using 50% by weight other soy protein isolates when they are in a soluble liquid form or when they are processed to optimize protein solubility as hereinafter described.

Different types of fat and edible oil products were evaluated for use in egg yolk replacers. Good results were obtained using 10 to 25% by weight soybean oil which is readily available. However, peanut and other vegetable oils can also be used and they give better results than solid fats such as hydrogenated shortenings and lard which were also tested.

Various lecithin products were tested as substitutes for the phospholipids, namely, the lecithin and cephalin present in natural egg yolk to provide the emulsification properties essential for good functional performance in cake batter. 7 to 12% by weight lecithin was found to produce good results.

Beta-carotene 1% in oil solution was chosen for coloring the emulsions because this is a natural product and the cost is lower than the other natural pigments in egg such as xanthophylls and zeaxanthin.

Disodium phosphate and surfactants including sorbitan monostearate, polysorbate 60 and sodium stearoyl-2-lactylate 2 to 4% by weight may be added to aid in solubilizing the protein and to provide emulsifying properties.

When protein solutions are used such as liquid soy protein isolate, the pH is adjusted if necessary using alkali solution of sodium hydroxide, and other ingredients are added and the mixture is emulsified.

As mentioned, processes were developed to improve the solubility and functional properties of dry soy protein isolates for use in lipoprotein emulsions. When using dried protein products which are difficult to dissolve, the required solubility is obtained by adjusting the pH of the protein dispersion to a neutral or slightly alkaline pH, depending upon the solubility and functional properties of the specific protein used, heating the solution to 120° to 180° and homogenizing. The effect of mild alkaline pH on the solubility of soy protein is well known. The combined action of mild alkaline pH plus heating and homogenizing to break up the protein aggregates is particularly effective in dissolving soy protein isolates.

Protein solubility studies at different pH values showed that the desired results could be obtained by adjusting the pH of the protein dispersion to pH 7.0 to 9.5 with pH 8.5 to 9.5 the preferred range. Adjustment of protein dispersion to pH 9.0 to 9.5 improves the emulsifying capacity and the functional properties of the protein for use in egg yolk replacers. When the protein dispersion is adjusted to pH 9.5, the final pH of the lipoprotein emulsion is pH 8.4 to 8.8 which is about the same as the pH of commercially prepared dry whole egg products.

By way of example, the effects of pH, heating and homogenization on the solubility of selected soy protein isolates are shown in Table II. Based upon Table II, it can be realized that the solubility of Supro 620 soy protein isolate from Ralston Purina Co., St. Louis, Mo. was increased from 27.9% to 96.6% by adjusting the pH to 9.5, heating to 180° F. and homogenizing.

TABLE II

THE EFFECT OF pH, HEATING AND HOMOGENIZATION ON THE SOLUBILITY OF SOY PROTEIN ISOLATES

| Protein Treatment | % Soy protein isolate solubilized[1] | |
|---|---|---|
| | Supro 710 | Supro 620 |
| No Treatment[2] | 52.0 | 27.9 |
| Heated, Homogenized[3] | 69.0 | 90.9 |
| pH adjusted, prior to heating and homogenization[4] | | |
| pH 7 | 69.0 | 90.9 |
| pH 8 | 72.0 | — |
| pH 9 | 76.0 | — |
| pH 9.5 | — | 96.6 |
| pH 10 | 80.5 | — |
| pH 11 | — | 95.5 |

Note:
[1] Protein solubility determined by diluting protein to 2% then centrifuging at 14,350G for 6 minutes, supernatant separated and protein concentration determined by Kjeldahl nitrogen, percent soluble protein calculated:

% soluble protein = $\frac{\text{protein in supernatent}}{\text{Total protein}} \times 100$

[2] No treatment: Soy protein isolate was dispersed in water and used as is.
[3] Soy protein isolate water slurry was heated to 180° F. and homogenized using 2 passes through a Gaulin homogenizer of 2500/500 p.s.i.
[4] pH of soy protein isolate slurry was adjusted then heated to 180° F. and homogenized using 2 passes through a Gaulin homogenizer at 2500/500 p.s.i.

By way of example, the effect of pH on the functional properties of the egg yolk replacer Formula I-A made using Supro 710 soy protein isolate from Ralston Purina Co., St. Louis, Mo. is shown in Table III. From Table III, it can be realized that the cake specific volume and quality scores were improved when the pH of the protein solutions were increased from 7 through 10.

TABLE III

THE EFFECT OF pH USED TO SOLUBILIZE PROTEIN ON THE FUNCTIONAL PROPERTIES OF LIPOPROTEIN EMULSIONS IN SPONGE CAKE[1]

| | Test 7 | Test 8 | Test 9 | Test 10 | Control[2] (all egg) |
|---|---|---|---|---|---|
| pH used to solubilize Soy Protein pH-Lipoprotein Emulsion Formula I-A (Supro 710 soy protein isolate) Egg Yolk Replacer | 7 | 7.5 | 7.9 | 8.6 | |
| Cake Batter, sp. gr. | 0.73 | 0.73 | 0.74 | 0.73 | 0.76 |
| pH | 6.9 | 6.9 | 7.0 | 7.0 | 7.0 |
| Cake, Volume, cc. | 107 | 109 | 108 | 112 | 112 |
| Weight, gm. | 28.8 | 28.8 | 28.5 | 28.5 | 28.6 |
| Sp. volume, cc/gm. | 3.72 | 3.78 | 3.79 | 3.93 | 3.92 |
| Cake Scores: | | | | | |
| Symmetry (10) | 7 | 8 | 8 | 8 | 8 |
| Crust character (10) | 8 | 8 | 8 | 8 | 8 |
| Crumb character (10) | 7 | 8 | 8 | 8 | 8 |
| Internal uniformity (10) | 7 | 8 | 8 | 8 | 8 |
| Texture (12) | 8 | 9 | 10 | 10 | 10 |
| Grain (12) | 7 | 9 | 10 | 11 | 11 |
| Eating quality (13) | 12 | 12 | 12 | 12 | 12 |
| Tenderness (13) | 12 | 12 | 12 | 12 | 12 |
| Flavor (12) | 11 | 11 | 11 | 11 | 11 |
| Total Score (100) | 79 | 85 | 87 | 88 | 88 |

Note
[1] Sponge cake baked using 50% egg yolk replacement.
[2] Control - all egg, Henningsen's Hentex 70 whole egg blend was used - pH 8.8

The effect of increased protein solubility on the functional properties of the lipoprotein emulsion used as an egg yolk replacer was studied in cake baking tests in which 50% of the natural egg yolk was replaced with lipoprotein emulsion. The results of these tests indicate that the cake volume as well as appearance, texture, grain, tenderness and eating quality were improved by treating the edible protein used in the lipoprotein emulsion to improve their solubility in the emulsion system by use of pH adjustment, heating and homogenization as described hereinafter.

PROCESSES USED TO PREPARE LIPOPROTEIN EMULSIONS

Illustrations of the processes which can be used to prepare lipoprotein emulsions in accordance with the present invention to produce an egg yolk substitute with good functional properties for use in cake and other bakery products are shown in FIGS. 1 to 4.

Figures 1, 2:
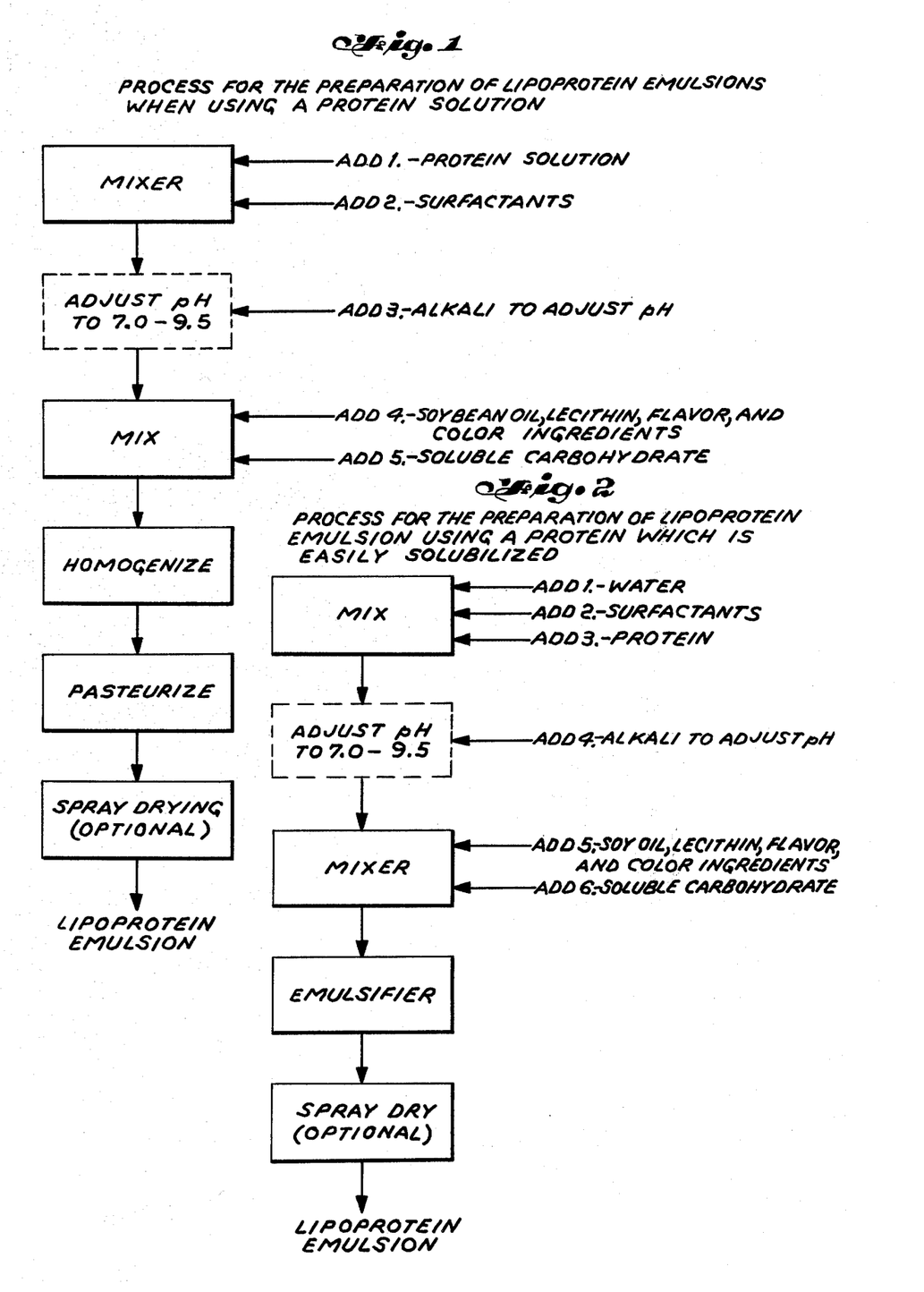
FIG. 1 is a schematic representation of the process for preparation of lipoprotein emulsions starting with a protein solution.
FIG. 2 is a schematic representation of the process for the preparation of lipoprotein emulsions using a dry protein which has high solubility and is easily dissolved in water.

Process I:

FIG. 1 shows the procedure employed when protein solution, such as liquid soy protein isolate, is used. The protein solution is mixed with the surfactants after which an alkali is added to adjust the pH of the mixture after which the edible oil, lecithin, flavor, color and soluble carbohydrate is added. The mixture is then homogenized and pasteurized. The liquid lipoprotein emulsion produced may optionally be spray dried.

Process II:

When soluble dried protein ingredients such as Supro 700 soy protein isolate from Ralston Purina Co., St. Louis, Mo. is used to prepare egg yolk replacers, effective results are obtained using the process illustrated in FIG. 2. As shown, the protein is dissolved by high speed mixing in water at room temperature containing disodium phosphate and surfactants such as sorbitan monostearate, polysorbate 60, and sodium stearyl-2-lactylate. Soybean oil, lecithin, beta-carotene and sucrose or other soluble carbohydrates are added with thorough mixing. The mixture is then emulsified using a Gaulin Homogenizer with the first stage set at 2500 psi and the second stage at 500 psi. The liquid lipoprotein emulsion can be used to replace egg yolk or it can be spray dried or freeze dried to replace egg yolk solids.

Figure 3:
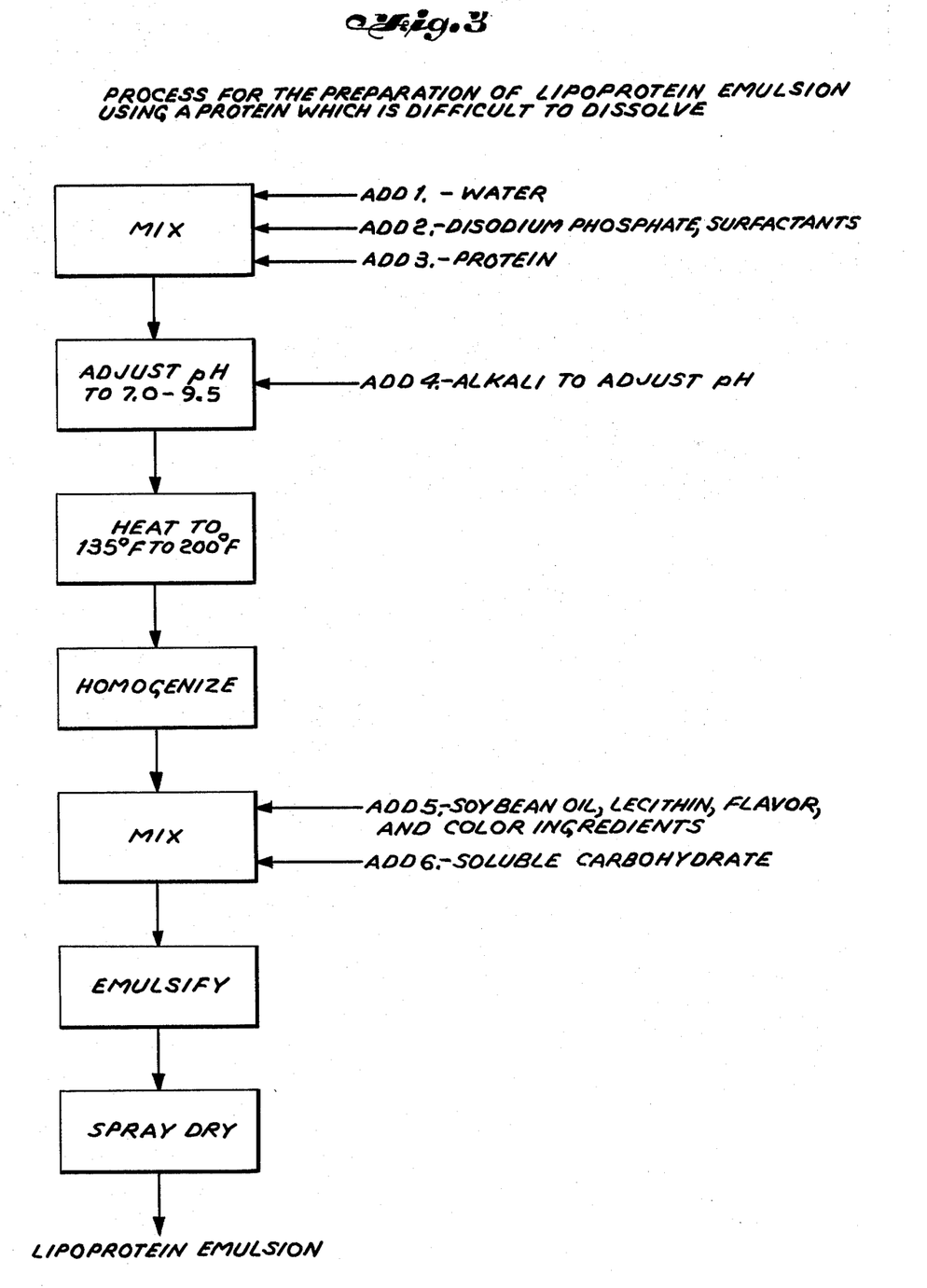
FIG. 3 is a schematic representation of the process for the preparation of lipoprotein emulsions using protein which is difficult to dissolve.

Process III:

FIG. 3 illustrates a process which gives good results with proteins which are difficult to solubilize such as, for example, Formula I-A preparation. Preparation of the lipoprotein emulsion is accomplished by using the following procedure:

1. The disodium phosphate is mixed with one or more surfactants in warm water (approximately 110° F.) in a 50-gallon jacketed kettle.
2. The edible protein, such as a soy protein, is added slowly to water which was agitated using a relatively slow speed, but large bladed mixer. Mixing rpm was approximately 200–300, with an agitator of approximately 10-inch diameter, 3-lobed propeller shape. The dry soy protein isolate dispersed well with no lumping. Thorough mixing with good turbulence was obtained using the large mixing blade.
3. The pH is adjusted to a pH from 7.0 to 9.5 with an alkali such as sodium hydroxide solution.
4. Mixture is heated slowly while agitation continued. Material went from 90° F. to 180° F. in about 39 minutes with steam in/out of jacket at approximately 15 psi/5 psi, respectively.
5. Mix is then homogenized such as by using a Crepaco 2R positive pump to feed two Gaulin homogenizers in series, each homogenizer having first/second stages at about 2500/500 psi.
6. Edible oil, lecithin, and beta-carotene are blended together, then added to mix with agitation. The soluble carbohydrate, such as sugar is stirred into mix.
7. Mixture is again homogenized at similar pressures to step 5, but using only one homogenizer.
8. The emulsion is cooled to room temperature. It can be used as such in liquid form or it may be spray or freeze dried to produce a substantially dry product.
9. Spray drying may be accomplished using a 6-foot diameter, gas fired tower dryer, 35 feet tall.
10. Final product moisture should be maintained about 2–8% and preferably 4–5%.

Figure 4:
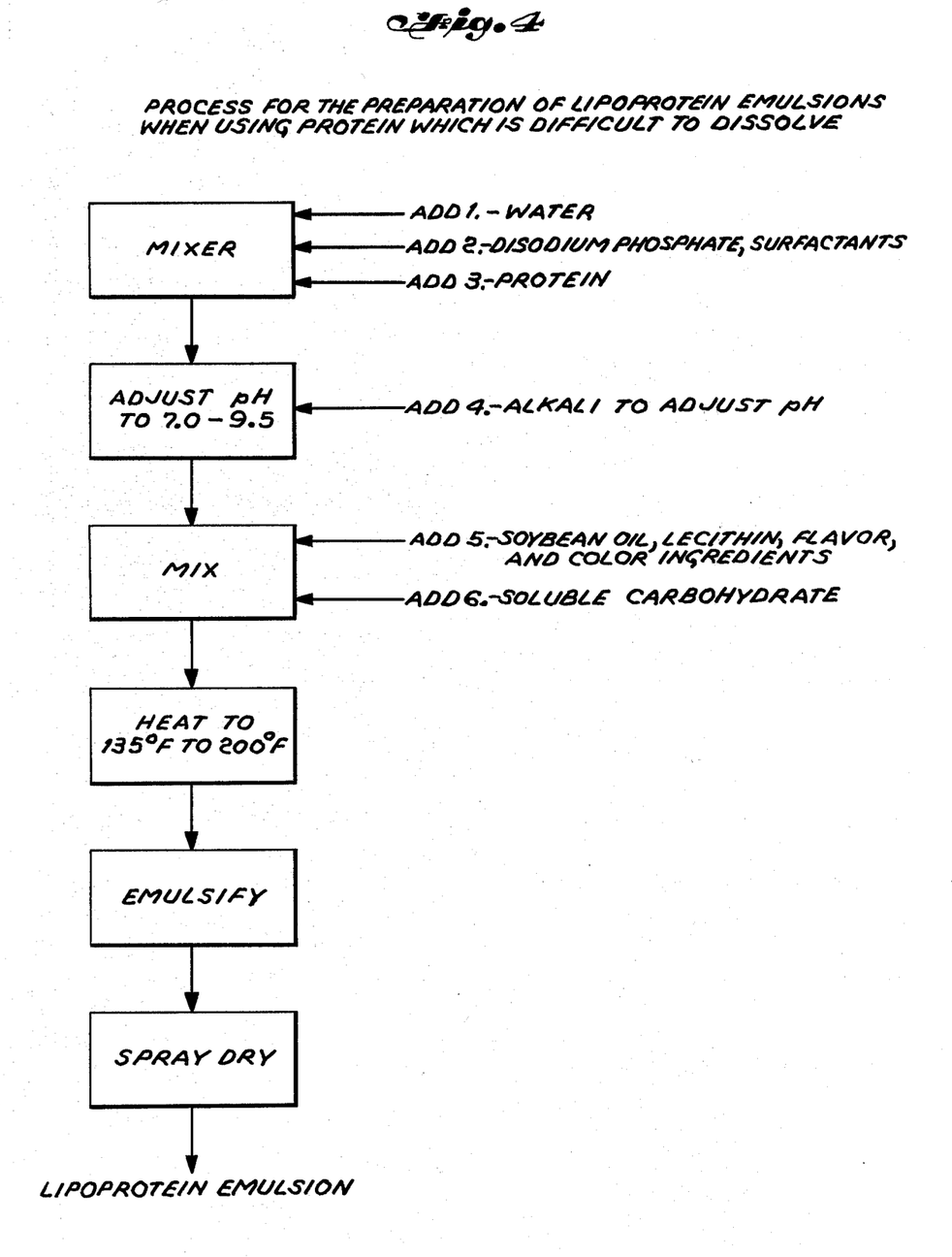
FIG. 4 is a schematic representation of a modified process of FIG. 3 for the preparation of lipoprotein emulsions when using protein which is difficult to dissolve.

Process IV:

The process shown in FIG. 4 differs from Process III described in connection with FIG. 3 in that the initial homogenizing step to solubilize the protein is eliminated and protein solubilization and emulsification are carried out simultaneously. Using the process shown in FIG. 4, the protein is dispersed and the pH adjusted the same as in Process III. The edible soybean oil, lecithin, beta-carotene and sucrose or other carbohydrate are added and the entire mixture may be homogenized twice through a Gaulin Homogenizer with the first stage set at 2500 psi and the second stage at 500 psi. After cooling, the emulsified egg yolk replacer can be used in the liquid form or dried the same ways as described above in reference to Process III.

Both Processes III and IV give good results but Process III is preferred since it is more effective with proteins that are difficult to dissolve.

PROCESS PARAMETERS AND PREFERRED CONDITIONS USING SOY PROTEIN ISOLATES FOR THE PREPARATION OF LIPOPROTEIN EMULSIONS (1) pH adjustment
  Range: pH 7.5 to 9.5
  Preferred: pH 8.5 to 9.5
(2) Temperature
  Range: 135° F. to 200° F.
  Preferred: 150° F. to 180° F.
(3) Homogenization
  Using a Gaulin Homogenizer:
  Range: 500 psi to 8000 psi
  Preferred: 2500 psi to 8000 psi Other conditions can be used with a colloid mill or similar equipment.

(4) Emulsify, Process II, Process III, and Process IV
  Using a Gaulin Homogenizer:
  Range: 500 psi to 5000 psi plus
  Preferred: 1500 psi to 2500 psi Replacements for whole egg solids were prepared by blending about 70 parts by weight of the dried egg yolk replacer, Formula I-A, with about 30 parts by weight of dried egg white which is approximately the ratio of egg yolk to white contained in dried whole egg or an equivalent amount of a heat coagulable protein such as Borden's protolac lactalbumin phosphate. These blends of yolk replacer and egg white were then used to replace about 50% of the whole egg solids used in sponge cake.

Formula I-A which contains a small amount of added soybean oil produced cakes with a very acceptable grain structure, tender texture, and good volume. Therefore, Formula I-A was selected as a general purpose egg yolk replacer for use in cake.

Formula I-B was developed as an egg yolk replacer for use in combination with whole egg solids to produce yolk fortified whole egg for use in cake formulas which require added egg yolk. A blend of approximately 38.6 parts by weight of Formula I-B with approximately 61.4 parts per weight whole egg solids was evaluated to replace a commercial yolk fortified whole egg solids product in chocolate snack cakes. The test cakes had very good volume, grain, texture and eating quality and were comparable to control cakes made using commercially available fortified whole egg solids.

The following examples illustrate the practice of the invention.

EXAMPLE I

Sponge Cake-A

As an example of the use of the invention, sponge cakes were made using Egg Yolk Replacer, Formula I-A to replace 50 percent of the egg yolk solids and the results compared with control cakes. The cakes contained the following ingredients:

| Ingredients | Approximate Percent by Weight | |
| --- | --- | --- |
| | Control | Test |
| Cake flour | 29.00 | 29.00 |
| Sugar | 27.83 | 27.83 |
| Water | 31.32 | 31.32 |
| Nonfat dry milk | 3.00 | 3.00 |
| Leavening | 1.50 | 1.50 |
| Salt | 0.80 | 0.80 |
| Emulsifier | 0.50 | 0.50 |
| Flavor | 0.20 | 0.20 |
| Whole egg blend[1] | 5.85 | 2.92 |
| Lipoprotein Formula I-A | — | 2.05 |
| Egg white solids | — | 0.88 |
| | 100 | 100 |

[1]Commercial whole egg blend containing 80% whole egg solids and 20% sucrose.

The cakes were prepared according to the following procedure. Combine and blend all the dry ingredients except the leavening in a Model C100 Hobart Mixer (Hobart Manufacturing Co., Troy, Ohio) at low (first) speed for 2 minutes with four wing beater. Add one half of the water and mix at high (third) speed for 3 minutes. Add the remaining water and leavening and mix 2 minutes at low (first) speed. Bake in a snack cake pan for 12 minutes at 400° F. This procedure was used for both the Test and Control cakes.

Results:

Cakes were evaluated at 24 hours and five days after baking for volume and overall cake quality. The test cakes were rated equal to the control at 24 hours and after 5 days storage. The cake quality scores of the test and control cakes at 24 hours were as follows:

| | Control | Test |
| --- | --- | --- |
| Cake volume, c.c. | 119.5 | 119.8 |
| Specific volume, c.c./g. | 4.00 | 3.95 |
| Cake scores: | | |
| Symmetry (10) | 10 | 10 |
| Crust character (10) | 10 | 10 |
| Crumb character (8) | 8 | 8 |
| Internal uniformity (10) | 9 | 9 |
| Texture (12) | 11 | 11 |
| Grain (12) | 12 | 11 |
| Eating quality (13) | 13 | 13 |
| Tenderness (13) | 12 | 12 |
| Flavor (12) | 12 | 11 |
| Total Score | 97 | 95 |

EXAMPLE II

Sponge Cake-B

As a different example of the use of the invention, sponge cakes were made by replacing 50% of the whole egg solids with a combination of Egg Yolk Replacer, Formula I-A, and a heat coagulable whey protein concentrate which was used in place of egg white. The ingredients used in the control and Test cakes were as follows:

| Ingredients | Approximate Percent by Weight | |
| --- | --- | --- |
| | Control | Test |
| Cake Flour | 29.00 | 29.00 |
| Sugar | 27.83 | 27.48 |
| Water | 31.32 | 31.32 |
| Nonfat dry milk | 3.00 | 3.00 |
| Leavening | 1.50 | 1.50 |
| Salt | 0.80 | 0.80 |
| Emulsifier | 0.50 | 0.50 |
| Flavor | 0.20 | 0.20 |
| Commercial whole egg blend[1] | 5.85 | 2.92 |
| Lipoprotein Formula I-A | — | 2.05 |
| Whey protein concentrate[2] | — | 1.23 |
| | 100 | 100 |

Note
[1]Commercial whole egg blend containing approximately 80% whole egg solids and 20% sucrose.
[2]Borden, Inc. "Protolac-Sodium" heat coagulable whey protein concentrate containing 57% protein.

The cakes were prepared according to the procedure as described in Example I. Combine and blend all the dry ingredients except the leavening in a Model C100 Hobart Mixer at low (first) speed for 2 minutes with a four wing beater. Add one half of the water and mix at high (third) speed for 3 minutes. Add the remaining water and leavening and mix 2 minutes at low (first) speed. Bake in a snack cake pan for 12 minutes at 400° F. This procedure was used for both the Test and Control cakes.

Results:

Cakes were evaluated at 24 hours and five days after baking for volume and overall cake quality. The test cakes were rated comparable to the control at 24 hours and after 5 days storage. The cake quality scores of the test and control cakes at 24 hours were as follows:

| | Control | Test |
| --- | --- | --- |
| Cake Volume, c.c. | 119.5 | 119.0 |
| Specific Volume, c.c./g. | 4.0 | 4.0 |
| Cake Scores: | | |
| Symmetry (10) | 10 | 10 |
| Crust character (10) | 10 | 9 |
| Crumb character (8) | 8 | 8 |
| Internal uniformity (10) | 9 | 9 |
| Texture (12) | 11 | 11 |
| Grain (12) | 12 | 11 |
| Eating quality (13) | 13 | 13 |
| Tenderness (13) | 12 | 12 |
| Flavor (12) | 12 | 11 |
| Total Score | 97 | 94 |

EXAMPLE III

Layer Cake

As a third example of the practive of this invention, layer cakes were baked using Egg Yolk Replacer, Formula I-A, to replace 50 percent of the egg yolk solids and the results compared with control cakes. The ingredients used in these cakes were as follows:

| Ingredients | Approximate Percent by Weight | |
| --- | --- | --- |
| | Control | Test |
| Cake flour | 24.50 | 24.50 |
| Sugar | 28.75 | 28.75 |

-continued

| Ingredients | Approximate Percent by Weight | |
|---|---|---|
| | Control | Test |
| Shortening | 7.00 | 7.00 |
| Nonfat dry milk | 3.00 | 3.00 |
| Leavening | 1.50 | 1.50 |
| Salt | 0.75 | 0.75 |
| Emulsifier | 0.50 | 0.50 |
| Whole egg blend[1] | 3.75 | 1.88 |
| Lipoprotein Formula I-A | — | 1.31 |
| Egg white solids | — | 0.56 |
| Water | 30.25 | 30.25 |
| | 100 | 100 |

Note:
[1] Commercial whole egg blend containing 80% whole egg solids and 20% sucrose.

Procedure:
The cakes were prepared according to the following procedure. Combine and blend all the dry ingredients except the leavening in a Model C100 Hobart Mixer (Hobart Manufacturing Co., Troy, Ohio) at low (first) speed for 2 minutes. Add shortening and two-thirds of the water while mixing at low (first) speed with a four wing beater. Mix 2½ minutes at high (third) speed, add the remaining water and mix 2 minutes at low (first) speed.

Weight 13 ounces of batter into a greased 8" round layer cake pan. Bake 25 minutes at 375° F.

The same procedure was used for both the test and control cakes.

Results:
The cakes were evaluated at 24 hours and 5 days for volume and overall quality. The test cake was rated equal to the control at 24 hours and after 5 days. The cake quality scores after 24 hours were as follows:

| | Control | Test |
|---|---|---|
| Cake volume, c.c. | 1139 | 1135 |
| Specific Volume, c.c./g. | 3.39 | 3.37 |
| Cake scores: | | |
| Symmetry (10) | 10 | 10 |
| Crust character (10) | 9 | 10 |
| Crumb character (8) | 8 | 8 |
| Internal uniformity (10) | 9 | 9 |
| Texture (12) | 11 | 11 |
| Grain (12) | 11 | 10 |
| Eating quality (13) | 13 | 13 |
| Tenderness (13) | 12 | 12 |
| Flavor (12) | 12 | 12 |
| Total Score | 95 | 95 |

EXAMPLE IV

Chocolate Cup Cake

Fortified whole egg solids which contain added egg yolk are a common ingredient in many cake formulas. As a fourth applicable example of the practice of this invention, chocolate cup cakes were prepared using fortified whole egg solids for the Control Cake and Test Cakes were prepared using whole egg solids fortified with Egg Yolk Replacer, Formula I-B. The following constituents were used in the Control and Test Cakes:

| Ingredients | Approximate Percent by Weight | |
|---|---|---|
| | Control | Test |
| Cake flour | 23.30 | 23.30 |
| Sugar | 26.90 | 26.90 |
| Shortening, emulsified | 6.30 | 6.30 |
| Coca | 4.90 | 4.90 |
| Nonfat dry milk | 2.60 | 2.60 |
| Salt | 0.60 | 0.60 |
| Baking Powder | 0.70 | 0.70 |
| Baking Soda | 0.60 | 0.60 |
| Water | 30.60 | 30.60 |
| Fortified whole egg | 3.50 | — |
| Commercial Whole Egg Blend[1] | — | 2.15 |
| Lipoprotein Formula I-B | — | 1.35 |
| | 100 | 100 |

Note:
[1] Commercial Fortified Whole Egg Blend containing added egg yolk.

Procedure:
The cakes were prepared according to the following procedure: Combine and blend the dry ingredients, add the shortening and two-thirds of the water, mix 1 minute at low (first) speed and 2 minutes at medium (second) speed in a C100 Hobart Mixer using a four wing beater. Add baking powder, soda and the remaining water and mix 2 minutes at low (first) speed on the Hobart mixer.

Weigh 30 gram portions into greased cup cake pans and bake 14 minutes at 380° F.

Results:
The cakes were evaluated after 24 hours and 5 days for volume and eating quality. The Test cakes had volume, appearance, internal texture and flavor equal to the Control. Details of the cake quality scores were as follows:

| | Control | Test |
|---|---|---|
| Cake Volume, c.c. | 89.5 | 89.3 |
| Specific volume, c.c./g. | 3.35 | 3.34 |
| Cake scores: | | |
| Symmetry (10) | 9 | 9 |
| Crust character (10) | 8 | 8 |
| Crumb character (8) | 7 | 7 |
| Internal uniformity (10) | 8 | 9 |
| Texture (12) | 11 | 11 |
| Grain (12) | 11 | 11 |
| Eating quality (13) | 12 | 12 |
| Tenderness (13) | 11 | 11 |
| Flavor (12) | 11 | 10 |
| Total Score | 88 | 88 |

EXAMPLE V

Cake Donuts

As another example of the practice of this invention, two different lots of cake donuts were prepared, a donut Control which contained egg yolk solids and Test donuts made with the addition of Egg Yolk Replacer, (Formula I-A) to supplement the egg yolk. The cake donuts contained the following ingredients:

| Ingredients | Approximate Percent by Weight | |
|---|---|---|
| | Control | Test |
| Pillsbury donut flour | 46.35 | 45.08 |
| Sugar | 14.61 | 14.21 |
| Dextrose | 1.76 | 1.71 |
| Nonfat dry milk | 2.32 | 2.26 |
| Vegetable oil | 1.41 | 1.37 |

-continued

| Ingredients | Approximate Percent by Weight | |
|---|---|---|
| | Control | Test |
| Salt | 0.70 | 0.68 |
| Emulsifier | 0.20 | 0.19 |
| Sodium acid pyrophosphate | 0.81 | 0.79 |
| Soda | 0.58 | 0.57 |
| Seasoning and flavoring | 0.27 | 0.26 |
| Egg yolk solids | 1.41 | 1.37 |
| Lipoprotein Formula I-A | — | 1.37 |
| Water | 29.58 | 30.14 |
| | 100.00 | 100.00 |

Procedure:

The donuts were prepared according to the following procedure: Combine ingredients in bowl and mix 1 minute at low (first) speed on C100 Hobart Mixer using a dough hook, mix 2 minutes at medium (second) speed. Allow a floor time of 10 minutes for the dough to develop. A DCA Lincoln model fryer was used to fry the donuts. Donuts were fried 60 seconds per side in 380° F. fat.

Results:

The addition of lipoprotein egg yolk replacer significantly improved the volume, overall quality and prolonged the shelf life of the donuts. Over a period of eight days, the test donuts were consistently rated higher in freshness, tenderness and overall eating quality. A quality comparison is shown in the following table:

| | Control | Test |
|---|---|---|
| Weight, g. | 32.69 | 33.25 |
| Volume, c.c. | 81.5 | 89.75 |
| Sp. Volume, c.c./g. | 2.49 | 2.70 |
| Appearance (15) | 15 | 15 |
| Crust Color (10) | 9 | 9 |
| Crumb Color (15) | 15 | 14 |
| Crumb Uniformity (15) | 14 | 14 |
| Texture (15) | 13 | 15 |
| Eating Quality (15) | 14 | 15 |
| Flavor (15) | 15 | 15 |
| Total Score | 95 | 97 |
| % Fat | 24.84 | 22.6 |
| % Moisture | 22.45 | 24.08 |

EXAMPLE VI

Muffins

As yet another applicable example of the practice of the invention, common muffins were prepared using lipoprotein Formula I-A to replace 100% of the egg yolk in the muffin formula.

Muffins were prepared using the following ingredients:

| Ingredients | Approximate Percent by Weight | |
|---|---|---|
| | Control | Test |
| Flour | 39.00 | 39.00 |
| Sugar | 8.50 | 8.50 |
| Vegetable oil | 5.00 | 5.00 |
| Nonfat dry milk | 3.00 | 3.00 |
| Leavening | 2.00 | 2.00 |
| Salt | 0.65 | 0.65 |
| Water | 37.35 | 37.35 |
| Whole egg solids[1] | 4.50 | — |
| Lipoprotein Formula I-A | — | 3.15 |
| Egg white solids | — | 1.35 |
| | 100 | 100 |

Note:
[1] Commercial whole egg blend containing 80% whole egg solids and 20% sucrose.

Procedure:

The muffins were prepared using the following procedure: Combine and blend the dry ingredients, add the shortening and water, mix 5 seconds at low (first) speed in a C100 Hobart Mixer, scrape the bowl, and mix an additional 5 seconds on low speed.

Weigh 50 gram portions into greased cup cake pans and bake 18 minutes at 425° F.

Results:

The Test and Control muffins had equal volume. The Test muffins had appearance, texture and eating quality equal to the Control.

The practice of the invention has been demonstrated in providing total or partial replacement of egg yolk in cake, donut, muffin and like products. While we have described above the principles of our invention in connection with specific examples and method steps, it is to be clearly understood that the description and examples are made only to enable practicing of the invention and not as a limitation to the scope of the invention as set forth in the objects thereof and in the accompanying claims.

We claim:

1. A process for the preparation of low cholesterol lipoprotein emulsions having protein binding and tenderizing properties and moisturizing effect suitable for use in edible food products, comprising the steps of:
    dissolving about 2 to 4% disodium phosphate, sorbitan monostearate, polysorbate 60, and sodium stearoyl-2-lactylate in warm water;
    dispersing about 30 to 55% of a soluble soy protein isolate in the water with agitation;
    adjusting the pH of the dispersion to about 7.0 to 9.5 by the addition of alkali;
    heating the pH adjusted protein dispersion to about 135° F. to 200° F. with agitation;
    homogenizing the heated dispersion twice through homogenizer with first stage pressure set at about 2500 psi and second stage set at about 500 psi;
    adding about 10 to 25% edible soybean oil, about 7 to 12% lecithin, flavor, color, and about 20 to 35% of a soluble carbohydrate ingredient to the protein solution with agitation;
    emulsifying the total mixture in homogenizer with first stage set at about 2500 psi and second stage set at about 500 psi; and
    cooling the emulsion, such process steps resulting in an emulsion having lipoprotein conjugates that are hydrophilic protein-lipid dipoles which reduce the interfacial tension between the oil and water phase and may be used as an ingredient in edible food products for tenderizing, moisturizing as well as protein binding.

2. The process of claim 1, including spray drying the emulsion to a final product moisture of about 2 to 8%.

3. The process of claim 1, wherein the soy protein isolate used has film forming properties which enhance the cell structure and texture of the lipoprotein emulsion when used in baked food products.

4. A lipoprotein emulsion product obtained in accordance with the process of claim 2.

5. A process for the preparation of low cholesterol lipoprotein emulsions having protein binding and tenderizing properties and moisturizing effect suitable for use in cake and other edible food products, comprising the steps of:

dissolving about 30 to 55% of a soluble soy protein isolate by mixing in water containing about 2 to 4% disodium phosphate, sorbitan monostearate, polysorbate 60 and sodium stearoyl-2-lactylate;

adjusting the pH of the resulting mixture to about 7.0 to 9.5 by the addition of an alkali;

adding about 10 to 25% edible soybean oil, about 7 to 12% lecithin, flavor, color, and about 20 to 35% of a soluble carbohydrate ingredient with thorough mixing;

emulsifying the total mixture in homogenizer with the first stage set at about 2500 psi and second stage set at about 500 psi, such process steps resulting in an emulsion having lipoprotein conjugates that are hydrophilic protein-lipid dipoles which reduce the interfacial tension between the oil and water phase and may be used as an ingredient in edible food products for tenderizing, moisturizing as well as protein binding.

6. The process of claim 5 including spray drying the emulsion to a final egg yolk replacer product moisture of about 2 to 8%.

7. The process of claim 5, wherein the soy protein isolate used has film forming properties which enhance the cell structure and texture of the lipoprotein emulsion when used in baked food products.

8. A lipoprotein emulsion product obtained in accordance with the process of claim 6.

9. A process for the preparation of low cholesterol lipoprotein emulsion having protein binding and tenderizing properties and moisturizing effect suitable for use in cake and other edible food products, comprising the steps of:

(a) dispersing about 30 to 55% soluble soy protein isolate in warm water with agitation;

(b) adjusting the pH of the protein solution to about 8.5 to 9.5 by addition of sodium hydroxide solution;

(c) heating the pH adjusted solution to about 130° F. to 212° F. with agitation;

(d) homogenizing the heated solution through a homogenizer with first stage pressure set between 500 psi to 8000 psi and second stage set between 500 psi to 8000 psi;

(e) adding about 10 to 25% edible soybean oil, about 7 to 12% lecithin, flavor, color, and about 20 to 35% of a soluble carbohydrate ingredient to the homogenized solution with agitation;

(f) emulsifying the total mixture in homogenizer with first stage set between 500 psi to 8000 psi and second stage set between 500 psi and 8000 psi; and (g) cooling the emulsion, such process steps resulting in an emulsion having lipoprotein conjugates that are hydrophilic protein-lipid dipoles which reduce the interfacial tension between the oil and water phase and may be used as an ingredient in edible food products for tenderizing, moisturizing as well as protein binding.

10. The process of claim 9, including spray drying the emulsion to a final product moisture of about 2 to about 8%.

11. The process of claim 9, wherein the soy protein isolate used has film forming properties which enhance the cell structure and texture of the lipoprotein emulsion when used in baked food products.

12. A lipoprotein emulsion product obtained in accordance with the process of claim 10.

13. A process for the preparation of low cholesterol lipoprotein emulsion having protein binding and tenderizing properties and moisturizing effect suitable for use in cake and other edible food products, comprising the steps of:

(a) dissolving about 30 to 55% of soy protein isolate by mixing in water containing material selected from the group consisting of sorbitan monostearate, disodium phosphate, polysorbate 60, and sodium stearoyl-2-lactylate;

(b) adjusting the pH of the dispersion of about 8.5 to 9.5 by the addition of sodium hydroxide solution;

(c) adding about 10 to 25% edible soybean oil, about 7 to 12% lecithin, color, flavor, and about 20 to 35% of a soluble carbohydrate ingredient with thorough mixing;

(d) heating to about 135° F. to 200° F. with agitation;

(e) emulsifying in homogenizer with first stage set at about 2500 psi and second stage set at about 500 psi; and (f) cooling the emulsion, such process steps resulting in an emulsion having lipoprotein conjugates that are hydrophilic protein-lipid dipoles which reduce the interfacial tension between the oil and water phase and may be used as an ingredient in edible food products for tenderizing, moisturizing as well as protein binding.

14. The process of claim 13 including spray drying the emulsion to a final product moisture of about 2 to 8%.

15. A lipoprotein emulsion product obtained in accordance with the process of claim 14.

16. The process of claim 13, wherein the soy protein isolate used has film forming properties which enhance the cell structure and texture of the lipoprotein emulsion when used in baked food products.

17. The process of claim 13, wherein the pH of the dispersion is adjusted to about 9.

18. The process of claim 1, wherein the pH of the dispersion is adjusted to about 9.

* * * * *